United States Patent [19]

Bailey et al.

[11] Patent Number: 5,436,396
[45] Date of Patent: Jul. 25, 1995

[54] STABILIZING COMPOSITIONS AND METHODS FOR STABILIZING SUBTERRANEAN FORMATIONS

[75] Inventors: Philip E. Bailey; Timothy J. Shean, both of Bristol, Tenn.; Raymond R. Chervenak, Bristol, Va.

[73] Assignee: Sandvik Rock Tools, Inc., Bristol, Va.

[21] Appl. No.: 902,163

[22] Filed: Jun. 22, 1992

[51] Int. Cl.⁶ .................................................. C09K 7/00
[52] U.S. Cl. ................................... 523/130; 523/131; 523/132; 523/218
[58] Field of Search ............... 523/130, 131, 132, 218

[56] References Cited

U.S. PATENT DOCUMENTS

| | | | |
|---|---|---|---|
| 3,091,935 | 6/1963 | Brown et al. | 61/36 |
| 3,091,936 | 6/1963 | Lundberg et al. | 61/36 |
| 3,108,442 | 10/1963 | Miller | 61/45 |
| 3,163,010 | 12/1964 | Carpenter | 61/36 |
| 3,374,834 | 3/1968 | Ramos et al. | 166/33 |
| 3,391,542 | 7/1968 | Herrick et al. | 61/36 |
| 3,580,883 | 5/1971 | Kasahara et al. | 260/41 |
| 3,686,872 | 8/1972 | Whitworth et al. | 61/36 R |
| 3,726,509 | 4/1973 | Lammers et al. | 259/7 |
| 3,788,081 | 1/1974 | Sarkisian et al. | 61/36 R |
| 3,802,203 | 4/1974 | Ichise et al. | 61/36 R |
| 3,878,686 | 4/1975 | Hageman et al. | 61/36 R |
| 3,882,684 | 5/1975 | Meyer et al. | 61/45 B |
| 3,892,442 | 7/1975 | Janssen | 299/11 |
| 4,260,699 | 4/1981 | Plaisted | 525/27 |
| 4,268,337 | 5/1981 | Ibata et al. | 156/244.17 |
| 4,273,689 | 6/1981 | Smearing | 260/22 |
| 4,280,943 | 7/1981 | Bivens et al. | 260/29.2 |
| 4,295,762 | 10/1981 | Slovinsky | 405/264 |
| 4,305,687 | 12/1981 | Parker | 405/260 |
| 4,307,980 | 12/1981 | Meyer et al. | 405/264 |
| 4,391,555 | 7/1983 | Burger et al. | 405/264 |
| 4,402,633 | 9/1983 | Self | 405/211 |
| 4,413,931 | 11/1983 | McDonald | 405/264 |
| 4,452,551 | 6/1984 | Arndt et al. | 405/264 |
| 4,489,184 | 12/1984 | Woelfel | 523/466 |
| 4,744,193 | 5/1988 | Hatsuzaki et al. | 52/744 |
| 4,761,099 | 8/1988 | Mann et al. | 405/264 |
| 4,817,721 | 4/1989 | Pober | 166/295 |
| 4,822,849 | 4/1989 | Vanderlaan | 525/17 |
| 4,904,125 | 2/1990 | Schmidt et al. | 405/264 |
| 4,918,120 | 4/1990 | Vanderlaan et al. | 523/165 |
| 4,921,047 | 5/1990 | Summers et al. | 166/276 |
| 4,925,611 | 5/1990 | Shockney et al. | 264/135 |
| 4,965,292 | 10/1990 | Müller et al. | 521/110 |
| 5,005,647 | 4/1991 | Friedman et al. | 166/295 |
| 5,010,953 | 4/1991 | Friedman et al. | 166/288 |
| 5,028,456 | 7/1991 | Naton | 427/142 |

OTHER PUBLICATIONS

AKZO Product Bulletin, "Accelerator Systems", Jan. 1989.
Reichhold Product Bulletin, "Polylite 31520–05"®.

*Primary Examiner*—Paul R. Michl
*Assistant Examiner*—Edward Cain
*Attorney, Agent, or Firm*—Burns, Doane, Swecker & Mathis

[57] ABSTRACT

A method for stabilizing a subterranean formation which includes introducing a stabilizing composition into a subterranean formation, for example, by pumping into and through cracks and crevices in the formation and allowing the stabilizing compositions to cure thereby stabilizing the formation. The stabilizing composition includes a non-shrink synthetic resin, a catalyst and various additives and fillers.

23 Claims, No Drawings

STABILIZING COMPOSITIONS AND METHODS FOR STABILIZING SUBTERRANEAN FORMATIONS

FIELD OF THE DISCLOSURE

This disclosure relates to stabilizing compositions which are pumpable into cracks and crevices in subterranean formations and methods for stabilizing subterranean formations to prevent roof-fall, flooding and the like.

BACKGROUND OF THE DISCLOSURE

In mining, especially for coal deposits or the like, normally one or more access tunnels or entries are cut into the seam or deposit to be mined. In one commonly used method, called the longwall method, the product is cut with a shearer or plow from a wall of the mine and removed by a conveyor or other means until the plow has been moved the desired distance into the deposit. As the cavity from where the mined product has been removed becomes large, the roof begins to crumble and fall into the mine. Thus, each time the plow removes portions of the wall, the roof supports and the conveyor or other removal means are moved towards the new wall or face, and the roof in the direction away from the plow progression crumbles into the mine. See, e.g., the description of longwall mining by Janssen in U.S. Pat. No. 3,892,442.

A number of methods have been used to prevent the roof of subterranean formations from falling. Typically, either timbers frames or rock-bolts are used to create a supporting structure that prevents the roof of the mine in direct contact with the supporting structure from falling. In timber framing operations, timbers are used to build a frame around the periphery of the mine such that a supporting structure is formed. In rock-bolting operations, a hole is drilled into a subterranean formation wherein a self-setting composition is used to secure an anchor bolt. Typically, such self-setting compositions are provided in a cartridge which comprises a resin and a catalyst. For example, Plaisted in U.S. Pat. No. 4,260,699, discloses a polyester adhesive system and a method of using the system in a cartridge containing a resin and a catalyst.

However, the above methods for supporting subterranean formations are not always acceptable or easily performed. Thus, stabilizing compositions, which are pumped into cracks and crevices in the underground formation, are often utilized to stabilize the formation. Various compositions have been used to stabilize and strengthen the roof and walls of the formation. Many stabilizing systems have been proposed ranging from relatively simple cement based systems to complex, relatively costly gel-based systems containing water-soluble acrylamide copolymers and various phenol formaldehyde resins.

Typically, however, most stabilizing compositions have not met with much commercial success as it is preferred that they contain relatively inexpensive components which are in plentiful supply; facilitate injection into the cracks and crevices in the formation; stabilize the load-bearing walls or other formation into a stable, rigid, water-resistant structure of substantial strength; be resistant to shrinkage; cure in a relatively short, but controllable, amount of time; and be relatively inert and non-toxic to avoid danger of injury to operating personnel and contamination of the area surrounding the formation.

Polyester resin compositions, as well as many other synthetic resin systems, has been proposed for use in grouting subterranean formations. For example, Brown et al., in U.S. Pat. No. 3,091,935, and Lundberg et al., in U.S. Pat. No. 3,091,936, have proposed the use of polyester grout compositions. However, the polyester systems described therein suffer from the disadvantage of being susceptible to shrinkage that may result in a catastrophic failure of the underground formation.

Consequently, polyurethane-based grouting systems are typically used to increase the load-bearing capacity of walls in underground mining when the composition is pumped into cracks and crevices within the mine. The polyurethane-based systems provide the desired strength and stability required of stabilizing compositions. For example, Müller et al., in U.S. Pat. No. 4,965,297, disclose a process for strengthening geological formations by the introduction of a composition which reacts to form polyurethane plastics in the formations. Typically, such reaction mixtures are based on a polyisocyanate component, a polyol component and various auxiliary agents and additives.

Polyurethane based systems, however, present significant health and safety hazards associated with the use of large amounts of isocyanates in enclosed and underground spaces. As will be appreciated by those skilled in the art, hazards such as emission of poisonous or noxious fumes, dust and the like, especially in mining operations, are particularly troublesome. Such fumes, dust and the like must be controlled or removed from the mine to prevent injury to mine workers. Ventilation techniques used to control such fumes typically employ systems which are expensive to maintain and operate, and which require elaborate planning to provide proper air flow paths.

In summary, state-of-the-art compositions and processes are susceptible to one or more disadvantages including slow gelling or curing rates; difficulty in injection into earth formations; shrinkage; sensitivity to the environment during injection and curing; and hazardous emissions. Thus, there remains a long-felt need to provide improved stabilizing compositions and methods of stabilizing subterranean formations.

SUMMARY OF THE DISCLOSURE

It is, therefore, an object of the present disclosure to provide a method for stabilizing a subterranean formation which includes introducing a stabilizing composition into a subterranean formation, for example, by pumping into and through cracks and crevices in the formation, and allowing the composition to cure thereby stabilizing the formation.

In one embodiment, the present disclosure describes a method for stabilizing a subterranean formation which includes introducing a stabilizing composition into a subterranean formation, and allowing the composition to cure thereby stabilizing the formation wherein the stabilizing composition includes a non-shrink polyester resin system and a catalyst therefor.

In another embodiment, the present disclosure describes a method for stabilizing a subterranean formation which includes introducing a stabilizing composition into a subterranean formation, and allowing the composition to cure thereby stabilizing the formation wherein the stabilizing composition includes a non-shrink synthetic resin system containing thermoplastic microspheres.

In another embodiment, the present disclosure describes a method for stabilizing a subterranean formation which includes introducing a stabilizing composition into a subterranean formation and allowing the composition to cure thereby stabilizing the formation wherein the stabilizing composition includes a polyisocyanate free non-shrink synthetic resin.

It is also an object of the present disclosure to provide a stabilizing composition for stabilizing the walls of subterranean formations such as mines. Thus, disclosed herein are the stabilizing compositions employed in the process disclosed in the present disclosure.

With the foregoing, as well as other objects, advantages, features and aspects of the invention that will become hereinafter apparent, the nature of the invention may be more clearly understood by reference to the detailed description and to the appended claims.

DETAILED DESCRIPTION OF THE PREFERRED EMBODIMENTS OF THE DISCLOSURE

The method for stabilizing a subterranean formation includes introducing a stabilizing composition in cracks and crevices in the formation. Preferably, a "non-shrink" polyester resin system or other "non-shrink" resin system which is curable at ambient temperature is utilized, and allowed to cure within the formation, thereby stabilizing the formation.

By use of the term "stabilizing," it is meant herein to include increasing the capacity of load-bearing walls, surfaces, or the like and/or sealing of walls, surfaces or the like of such formations thereby preventing, for example, roof-fall and collapse of the entire or parts of the formation and/or flooding and/or escape or entry of various gases and the like within such formations.

By use of the term "stabilizing composition," it is meant herein to include a composition which is suitable to stabilize subterranean formations, for example, a composition which will increase the load-bearing capacity of load-bearing walls, surfaces, or the like and/or seal walls, surfaces or the like which is pumpable into cracks and crevices within said formation as described below.

By use of the term "pumpable," it is meant herein to include a composition that may readily be pumped under pressure into cracks and crevices in a subterranean formation by conventional pumping apparatus used by those skilled in the art. Thus, the stabilizing compositions may be employed or applied by pumping the composition into cracks and crevices where the stabilizing composition cures. Most preferably, the stabilizing composition may be pumped from 2 to 2,000 feet into such cracks and crevices at a pressure of 2 lbs/in². More preferably, the stabilizing composition may be pumped at least 100 feet into such cracks and crevices at 2 lbs/in² even more preferably at least 500 feet at 2 lbs/in² and even more preferably at least 1,000 feet at 2 lbs/in².

Accordingly, the stabilizing compositions have a viscosity prior to curing that is suitable for pumping through, for example, nozzles and hoses and other such apparatus that is commonly used by those skilled in the art to apply such stabilizing compositions. In preferred embodiments of the invention, the method for stabilizing a subterranean formation employs a stabilizing composition possessing a viscosity below 30,000 centipoise, more preferably below 5,000 centipoise, and most preferably below 1,000 centipoise such that the composition may readily be pumped into cracks and crevices in subterranean formations.

In one embodiment of the invention, the stabilizing compositions of the present invention may employ a "non-shrink" unsaturated polyester resin system, a catalyst system and preferably one or more organic or inorganic fillers. By use of the phrase "non-shrink" polyester resin system, it is meant an unsaturated polyester resin or unsaturated polyester resin-containing composition that does not shrink more than one volume percent from the start to the finish of curing. Preferably, the polyester resin system shrinks less than 0.5 volume percent, and more preferably less than 0.1 volume percent. Most preferably, the resin system does not shrink. However, relatively low shrinkage resin systems, i.e., shrinkage of less than one volume percent, may be employed.

The "non-shrink" resin system may alternatively include a mixture of expanding and shrinking resins where the shrinkage of the shrinking resin is compensated by the expansion of the expanding resins. Of course, such mixtures are included in the definition of the term "non-shrink" polyester resin system as long as there is a polyester resin and the entire resin formulation does not shrink more than one volume percent. In addition to mixtures of shrink and expanding resin systems, the phrase "non-shrink" polyester resin system is meant to include various copolymers, terpolymers and the like which exhibit the desired low shrinkage properties.

In another embodiment, the "non-shrink" resin system may also contain a polyester resin and thermoplastic microspheres employed in an amount sufficient to prevent the resin formulation from shrinking upon curing. In this regard, it is known that typical curing of synthetic resin compositions is exothermic. In other embodiments, other "non-shrink" resin systems may be employed either with or without the presence of a polyester resin system. That is, other resin systems employing the use of thermoplastic microspheres may be utilized. Such systems may include acrylic, epoxy and polyurethane type systems which release enough heat upon curing to expand the microspheres. Preferably, however, the polyurethane systems are not employed.

In each of the above cases, it is preferred to utilize systems which are free from or at least substantially free from isocyanates. Most preferably, the "non-shrink" resins are polyester resin systems.

Preferred "non-shrink" polyester resin systems are marketed under the tradename Polylite ® by Reichhold Chemicals, Inc. Particularly preferred resins include Reichhold's Polylite ® 31520-05 RTM unsaturated polyester resin which is a resin for liquid composite/resin transfer molding processes where low shrink, non-warping and/or Class A molded parts are desired. Tables 1-3 provide the product specifications, typical cured resin properties, and typical mechanical properties of Polylite ® 31520-05 RTM as provided by Reichhold in the Product Bulletin for Polylite ® 31520-05 RTM resin.

TABLE 1

PRODUCT SPECIFICATIONS OF POLYLITE ® POLYESTER RESIN AT 25° C.

| | |
|---|---|
| Flash point, Seta closed cup, Degrees F. | 89 |
| Shelf life, minimum, months | 3 |
| % Solids Content | 50–55 |

TABLE 1-continued

PRODUCT SPECIFICATIONS OF POLYLITE ® POLYESTER RESIN AT 25° C.

| | |
|---|---|
| Viscosity Brookfield Model LVT, No. 1 Spindle @ 30 rpm, cps | 90–150 |
| Monomer | Styrene |
| Specific Gravity | 1.02–1.09 |
| Room Temp. Gel Time, 77° F. | 5.0–10.0 min. |
| Total Cure | 10.0–25.0 min. |
| Peak Exotherm, °F. | 410–460 |
| 1.25% by weight 46–750 | |

TABLE 2

TYPICAL CURED RESIN PROPERTIES OF POLYLITE ® POLYESTER RESIN

| | | |
|---|---|---|
| Barcol Hardness | ASTM D-2583 | 35 |
| Flexural Strength, psi | ASTM D-790-80 | 8100 |
| Flexural Modulus, × $10^6$ psi | ASTM D-790-80 | 2.8 |
| Tensile Strength, psi | ASTM D-638-80 | 4400 |
| Flexural Modulus, × $10^6$ psi | ASTM D-638-80 | 2.4 |
| Tensile Elongation, % @ Break | ASTM D-638-80 | 2.1 |
| Heat Distortion Temperature, (264 psi), °F. | ASTM D-648-72 | 175 |

TABLE 3

TYPICAL MECHANICAL PROPERTIES OF POLYLITE ® POLYESTER RESIN

| | | |
|---|---|---|
| Barcol Hardness | ASTM D-2483 | 50 |
| Flexural Strength, psi | ASTM D-790-80 | 24,000 |
| Flexural Modulus, psi × $10^6$ | ASTM D-790-80 | 1.1 |
| Tensile Strength, psi | ASTM D-638-80 | 15,000 |
| Tensile Elongation % @ Break | ASTM D-638-80 | 1.1 |
| IZOD Impact Strength (Unnotched) | ASTM D-638-80 | 19.0 |

Other versions of Polylite ® type polyester resin systems that may be suitable for use in the present invention include Polylite ® 31520-10, Polylite ® 31515-05 and Polylite ® 31515-00, each marketed by Reichhold Chemicals, Inc. See also copending United States application serial number 07/815,377 and any foreign counterpart application, if any, thereof.

While expanding resins may be employed in the present invention, it is preferred that the resin composition whether it be a mixture of resins or a single polyester resin exhibit little, if any, expansion. As with shrinkage, expansion of the stabilizing composition may be detrimental in some applications. Thus, it is preferred in certain applications to utilize a "non-expanding" polyester resin system. By use of the phrase "non-expanding" polyester resin system, it is meant a polyester resin system that does not expand more than one volume percent from the start to the finish of curing. In fact, in these embodiments, it is preferred that the polyester resin exhibits no expansion whatsoever.

In other embodiments of the invention, it may be desirable to utilize an expanding resin formulation. Thus, expanding resin formulations are included within the meaning of "non-shrink" resin. Such resin formulations may be prepared, for example, by employing thermoplastic microspheres in the resin formulation. Again, thermoplastic microspheres may be employed in polyester, acrylic, epoxy and polyurethane resin systems that release enough heat upon curing to cause the microspheres to expand. Preferred expansion is between about 0% to about 10%, more preferably between about 2% and about 5%.

The catalyst used to cure the polyester resin formulations may include any compound known to be suitably used to polymerize the "non-shrink" resin systems. Preferably, the catalyst is utilized in an amount between about 0.1 and about 5 wt %, more preferably between about 0.5 and about 4 wt %, and even more preferably between about 1.0 and about 2.0 wt %, based on the weight of the resin.

Preferred catalyst systems for use with polyester resin systems include the organic peroxide containing catalyst systems. Examples of such organic peroxides include benzoyl peroxide, cumyl peroxyneodecanoate, cumyl peroxyneoheptanoate, di-(sec-butyl) peroxydicarbonate, di-(2-ethylhexyl) peroxydicarbonate, t-amyl peroxyneodecanoate, t-butyl peroxyneodecanoate, t-amyl peroxyneoheptanoate, t-butyl peroxyneoheptanoate, t-amyl peroxypivalate, t-butyl peroxypivalate, di-isononanoyl peroxide, 2,5-dimethyl-2,5-di(2-ethyl hexanoylperoxy) hexane, t-amyl peroxy 2-ethylhexanoate, t-butyl peroxy 2-ethylhexanoate, perester/perketal, t-butyl monoperoxy maleate, 1,1 bis(t-amyl peroxy) cyclohexane, 1,1 bis(t-butyl peroxy) cyclohexane, t-butyl peroxy 2-ethylhexyl carbonate, t-butyl peroxy 2-ethylhexyl carbonate, t-butyl peroxy 2-methylbenzoate, t-butyl peroxycrotonate, t-amyl peroxybenzoate, t-butyl peroxybenzoate, ketone peroxides, dicumyl peroxide, t-butyl hydroperoxide, t-butyl hydroperoxide, di-t-butyl peroxide, t-amyl hydroperoxide, cumene hydroperoxide. Preferred catalysts include the benzoyl peoxide type catalysts such as SUPEROX ® 46-750, available from Reichhold Chemicals, Inc.

Since commonly used organic peroxide catalysts are stable at ambient temperature, as are other catalyst systems, it may be preferred to employ one or more catalyst accelerators or catalyst promoters. Any catalyst accelerator or catalyst promoter known to those skilled in the art may be included the stabilizing composition. These include, but are not limited to, cobalt naphthenate or octoate type accelerators, tertiary amine type accelerators, vanadium accelerators, manganese naphthenate or octoate type accelerators and quaternary ammonium salt type accelerators. Preferably, the accelerator is utilized in an amount between about 0.1 to about 5 wt %, more preferably between about 0.5 to about 4 wt %, and even more preferably between 1.0 and 2.0 wt %, based on the weight of the resin.

In addition to the "non-shrink" polyester resin system or other "non-shrink" resin system and catalyst systems, the stabilizing composition of the present invention preferably includes one or more inert organic or inorganic fillers. A preferred filler is calcium carbonate. Of course, other fillers well known to those skilled in the art such as sand and glass may be employed. In certain embodiments, the fillers may be employed in an amount greater than 15 wt %, more preferably greater than 30 wt %, even more preferably greater than 45 wt %, based on the weight of the resin. In other embodiments, the fillers may be employed in an amount greater than 50 wt %, more preferably greater than 75 wt %, more preferably greater than 100 wt %, and even more preferably greater than 120 wt % based on the weight of the resin. However, it is noted that the addition of too much filler may detrimentally affect the viscosity of the stabilizing composition thus rendering it unsuitable for pumping into cracks and crevice within subterranean formations. Likewise, the addition of too much filler may render the composition unsuitable for stabilizing subterranean formations as it will not possess sufficient strength. Of course, those skilled in the art will be able to readily determine the amount of filler that may be utilized for use in the process of the present invention.

The stabilizing compositions of the present invention may also include any one of a number of additives such as liquid extenders, anti-settling agents, and the like. Particularly preferred additives include a polymerization inhibitor, an adhesion promoter and/or a wetting agent.

Preferred polymerization inhibitors include hydroquinone and tert-butyl catechol type inhibitors. Preferably, the stabilizing composition includes an inhibitor in an amount from about 0.01 wt % to about 2 wt %, more preferably from about 0.1 to about 1.5 wt %, and even more preferably from about 0.25 to about 1.0 wt %, based on the weight of the resin.

Preferred adhesion promoters include the organo silane (methacrylate or vinyl) type promoters. Preferably, the stabilizing composition includes an adhesion promoter in an amount from about 0.01 wt % to about 2 wt %, more preferably from about 0.1 to about 1.5 wt %, and even more preferably from about 0.25 to about 1.0 wt %, based on the weight of the resin.

Preferred wetting agents include polyacrylate surface active agents and polyalkylene oxide modified with methyl polysiloxanes. Preferably, the wetting agents include an inhibitor in an amount from about 0.01 wt % to about 2 wt %, more preferably from about 0.1 to about 1.5 wt %, and even more preferably from about 0.25 to about 1.0 wt %, based on the weight of the resin.

From the above, a typical stabilizing composition of the present invention may include a stabilizing effective amount of a "non-shrink" polyester resin system or other "non-shrink" resin system, and based on the weight of the resin, at least 20 wt % inert filler, about 0.5 to about 5 wt % catalyst, about 0.5 to about 5 wt % catalyst promoter, less than 5 wt % liquid extenders, less than 1 wt % anti-settling agent, less than 2 wt % adhesion promoter, less than 2 wt % wetting agent, less than 2 wt % inhibitor and less than 3 wt % water.

As stated above, stabilizing compositions used in stabilizing subterranean formations are capable of being readily pumpable into cracks and crevices within the subterranean formations. The stabilizing composition may be employed as a two component or more component system wherein each component is mixed in a static mixing head prior to introduction into the subterranean formation. A wide variety of pumping apparatus and procedures are known to those skilled in the art.

One such procedure might include drilling a hole into the roof of a mine composed, for example, of an impure coal surface layer, above which is found various layers of sandy shale. Then, the stabilizing composition of the present invention may be pumped through a nozzle until no more resin may be pumped into that area or the stabilizing composition begins to seep out of neighboring holes.

The following examples are merely illustrative of the present invention and they should not be considered as limiting the scope of the invention in any way, as these examples and other equivalents thereof will become more apparent to those skilled in the art in light of the present invention.

In the examples, there is reference to strength tests. These tests were used to provide an index of the strength of the stabilizing compositions described in the examples. The procedure for indexing the strength of the examples included placing a No. 6 threaded deformed, reinforcing bar in the center of a 1.5 inch O.D. steel tube, per ASTM A53, Type S, with 27×3 internal metric threads, and pouring a completely mixed stabilizing composition into the annulus of the steel tube such that a void free ten inch chemical anchor was obtained. The rebar was several inches longer than the chemical anchor so that a loading apparatus could be attached. After the stabilizing composition was poured into the steel tube, it was allowed to gel and then cure for 1 hour. Then, a load was applied to the rebar to test the strength of the chemical anchor by measurement of the displacement of the rebar at the reported load. The displacement reported was a calculation of the total displacement minus the permanent displacement of the rebar. Failure of the chemical anchor was considered to occur when 0.100 inches of bar movement occurred.

COMPARATIVE EXAMPLE 1

Equal parts of ELASTOCAST ® 8000u isocyanate and ELASTOCAST ® 8000u polyurethane resin, each of which are available from MILES Corp. were mixed. Approximately 70 ml of the mix was used to prepare four strength test samples as outlined above. The test results are set forth in Table 4.

TABLE 4

| Strength Test Results of Unfilled Polyurethane Composition[1] | |
| --- | --- |
| Sample # | Strength (tons) |
| 1 | 10.5 |
| 2 | 8.5 |
| 3 | 9.0 |
| 4 | — |

[1]Out of the four tests, one failed due to a mechanical failure of the test apparatus.

Table 4 above demonstrates that the average strength, using the test procedure outlined above, is approximately 9.3 tons.

EXAMPLE 2

A non-shrink stabilizing composition containing 60 g of an unsaturated polyester resin (Polylite ® 31520-05, available from Reichhold Chemicals, Inc.), 0.6 g of a benzoyl peroxide catalyst (SUPEROX ® 46-750, available from Reichhold Chemicals, Inc.) and 0.6 g of a cobalt/amine promoter solution (PROMOTER SOLUTION 46-558-00, available from Reichhold Chemicals, Inc.) was prepared by mixing the three components at ambient temperature. The composition gelled in greater than 60 seconds. The cured product turned white, was very hard and exhibited some surface cracking.

EXAMPLE 3

A filled non-shrink stabilizing composition containing 66.7 g of an unsaturated polyester resin (Polylite ® 31520-05, available from Reichhold Chemicals, Inc.), 20.7 g of talc, 0.8 g of a benzoyl peroxide catalyst (SUPEROX ® 46-750, available from Reichhold Chemicals, Inc.) and 0.7 g of a cobalt/amine promoter solution (PROMOTER SOLUTION 46-558-00, available from Reichhold Chemicals, Inc.) was prepared by mixing the four components at ambient temperature. The composition gelled in greater than 60 seconds. The cured product turned white, was very hard and exhibited a significant increase in surface cracking over the composition prepared in Comparative Example 2. No significant increase in viscosity was obtained over the composition prepared in Comparative Example 2.

EXAMPLE 4

A filled non-shrink stabilizing composition containing 62.6 g of an unsaturated polyester resin (Polylite® 31520-05, available from Reichhold Chemicals, Inc.), 30.7 g talc, 0.9 g of a benzoyl peroxide catalyst (SUPEROX® 46-750, available from Reichhold Chemicals, Inc.) and 0.9 g of a cobalt/amine promoter solution (PROMOTER SOLUTION 46-558-00, available from Reichhold Chemicals, Inc.) was prepared by mixing the three components at ambient temperature. The composition gelled in 40 seconds. The cured product turned white, was very hard and exhibited a significant increase in surface cracking over the composition prepared in Example 3. A significant increase in viscosity was obtained over the composition prepared in Examples 2 and 3.

Examples 3–4 demonstrate that non-shrink systems may be filled with an inert filler. In fact, Example 4 demonstrates that the filler may reduce gel time. While surface cracking increased with an increase in filler, it is believed that the surface cracking increase was due to the presence of impurities in the talc.

EXAMPLE 5

A filled non-shrink stabilizing composition was prepared by mixing an unsaturated polyester resin (Polylite® 31520-05, available from Reichhold Chemicals, Inc.), and based on the weight of the resin, 100 wt % calcium carbonate (SNOWFLAKE® PE #10, available from ECC American, Inc.), 0.5 wt % polymerization inhibitor (10% TBC-tertiary-butyl catechol, supplied by Reichhold Chemicals, Inc.), 1.5 wt % cobalt/amine promoter (PROMOTER SOLUTION 46-558-00, available from Reichhold Chemicals, Inc.), and 1.5 wt % catalyst (SUPEROX® 46-750, available from Reichhold Chemicals, Inc.). The mixture was used to prepare chemical anchor samples described above and tested. The composition gelled in approximately 12 minutes.

EXAMPLE 6

A non-shrink stabilizing composition was prepared as in Example 5; however, the polyester resin (Polylite® 31520-05, available from Reichhold Chemicals, Inc.) contained a wetting agent. The composition gelled in approximately 24 minutes and exhibited some relatively minor shrinkage <1%.

EXAMPLE 7

A non-shrink stabilizing composition was prepared as in Example 5; however, the polyester resin (Polylite® 31520-05, available from Reichhold Chemicals, Inc.) contained an adhesion promoting agent (Byk A501 available from BYK Chemie). The composition gelled in approximately 26 minutes and exhibited some relatively minor shrinkage <1%.

The samples in each of Examples 5–7 were prepared and allowed to cure for approximately 1.0 hour after gelation. Then, each sample was tested according to the procedure set forth above. The test results are set forth below in Table 5.

TABLE 5

Strength Test Results of Filled Polyester Stabilizing Compositions

| TONS | DISPLACEMENT, mils | | |
|---|---|---|---|
| | Ex. 5 | Ex. 6 | Ex. 7 |
| 3 | 24 | 8 | 9 |
| 6 | 92 | 20 | 18 |
| 10 | 188 | 48 | 43 |
| 12 | 251 | 109 | 111 |
| Permanent Displacement | 218 | 53 | 64 |

As indicated above in Table 5, the compositions containing the polyester resins containing either the wetting agent or the adhesion promoting agent exhibited improved strength, i.e., lower displacement values over the composition which contained only the polyester resin.

EXAMPLES 8–10

The composition prepared in Example 6 was repeated except the amount of 10% TBC was reduced to 0.5 wt %, 0.3 wt % and zero wt %, in Examples 8–10, respectively. The compositions gelled in 15 minutes, 7 minutes and 10–15 seconds, in Examples 8–10, respectively.

The samples in each of Examples 8-10 were prepared and allowed to cure for approximately 1.0 hour after gelation. Then, each sample was tested according to the procedure set forth above. The test results are set forth below in Table 6.

TABLE 6

Strength Test Results of Filled Polyester Stabilizing Compositions

| TONS | DISPLACEMENT, mils | | |
|---|---|---|---|
| | Ex. 8 | Ex. 9 | Ex. 10 |
| 3 | 18 | 10 | 54 |
| 6 | 56 | 20 | 136 |
| 10 | 108 | 50 | 235 |
| 12 | 149 | 90 | 298 |
| Permanent Displacement | N/A | 62 | 250 |

As indicated above in Table 6, the composition containing no 10% TBC exhibited inferior displacement, i.e., longer displacement, than the compositions containing up to 0.5 wt % 10% TBC. However, the displacement, or lack thereof, is not directly proportional to the amount of 10% TBC added. In this regard, the sample containing only 0.3 wt % 10% TBC exhibited superior displacement over the sample containing 0.5 wt % 10% TBC.

EXAMPLES 11–12

A non-shrink stabilizing composition was prepared by mixing an unsaturated polyester resin (Polylite® 31520-05, available from Reichhold Chemicals, Inc.) with, based on the amount of resin, an amount of limestone as set forth below having a particle size approximately equal to 40 microns (GB1 type limestone, available from Franklin Industrial Minerals, Inc.), 0.25 wt % inhibitor (10% TBC), 1.5 wt % promoter solution (PROMOTER SOLUTION 46-558-00), and 1.5 wt % catalyst (SUPEROX® 46-750). In Example 11, 100 wt % limestone was employed which resulted in a composition having a gel time of approximately 4 minutes. In Example 12, 120 wt % limestone was employed which resulted in a composition having a gel time of approximately 4 minutes.

The compositions in each of Examples 11-12 were prepared and allowed to cure for approximately 1.0 hour after gelation. Then, each sample was tested according to the procedure set forth above. The test results are set forth below in Table 7.

TABLE 7

Strength Test Results of Filled Polyester Stabilizing Compositions

| TONS | DISPLACEMENT, mils | |
|---|---|---|
| | Ex. 11 | Ex. 12[2] |
| 3 | 22 | 11 |
| 6 | 40 | 23 |
| 10 | 65 | 51 |
| 12 | 97 | 88 |
| Permanent Displacement | 58 | 54 |

[2]Using a Brookfield ™ RV series viscometer with a #2 spindle at 25° C., this composition had a viscosity of 6080 cps at 25 rpm, 4730 cps at 5.0 rpm and 3320 cps at 10.0 rpm.

EXAMPLES 13-15

A non-shrink stabilizing composition was prepared by mixing an unsaturated polyester resin with, based on the amount of resin, 100 wt % calcium carbonate (SNOWFLAKE ™ PE #10), 0.25 wt % inhibitor (10% TBC), 1.5% promoter solution (PROMOTER SOLUTION 46558-00) and 1.5 wt % catalyst (SUPEROX ® 46-750). In Example 13, the unsaturated polyester resin (Polylite ® 31520-05) contained a wetting agent. In Example 14, the unsaturated polyester resin (Polylite ® 31520-05) contained an adhesion promoting agent. In Example 15, the unsaturated polyester resin contained a 50/50 blend of the resins in Example 13 and Example 14. The gel time of the compositions was approximately 3.5-4 minutes, 6 minutes and 4 minutes, respectively.

The samples in each of Examples 13-15 were prepared and allowed to cure for approximately 1.0 hour after gelation. Then, each sample was tested according to the procedure set forth above. The test results are set forth below in Table 8.

TABLE 8

Strength Test Results of Filled Polyester Stabilizing Compositions

| TONS | DISPLACEMENT, mils | | |
|---|---|---|---|
| | Ex. 13 | Ex. 14 | Ex. 15[3] |
| 3 | 14 | 9 | 11 |
| 6 | 25 | 20 | 27 |
| 10 | 42 | 51 | 63 |
| 12 | 71 | 141 | 113 |
| Permanent Displacement | 40 | 106 | 86 |

[3]Using a Brookfield ™ RV series viscometer with a #2 spindle at 25° C., this composition had a viscosity of 2110 cps at 5 rpm, 1580 cps at 10 rpm and 1190 cps at 20 rpm.

EXAMPLES 6, 17 AND COMPARATIVE EXAMPLES 18-19

A filled stabilizing composition was prepared by mixing a resin with, based on the amount of resin, 100 wt % calcium carbonate (SNOWFLAKE ® PE #10), 0.25 wt % inhibitor (10% TBC), 1.5 wt % promoter solution (PROMOTER SOLUTION 46-558-00) and 1.5 wt % catalyst (SUPEROX ® 46-750). In Examples 16 and 17, the synthetic resin was a 1:1 blend of two unsaturated polyester resins, each Polylite ® 31520-05, one resin containing a wetting agent. In Examples 18-19, the synthetic resin was a polyurethane resin (ELAS- TOCAST ® 8000u). In Examples 17 and 18, the steel tube was pretreated by allowing 15 mls of tap water to run down the walls 5 minutes before pouring the resin mixture in the tube. The gel time of the compositions (Examples 16-19) was approximately 4 minutes, 7 minutes, 1 minute and 1 minute, respectively.

The samples in each of Examples 16-19 were prepared and allowed to cure for approximately 1.0 hour after gelation. Then, each sample was tested according to the procedure set forth above. The test results are set forth below in Table 9.

TABLE 9

Strength Test Results of Filled Synthetic Resin Stabilizing Compositions

| TONS | DISPLACEMENT, mils | | | |
|---|---|---|---|---|
| | Ex. 16 | Ex. 17 | Comp. Ex. 18[4] | Comp. Ex. 19 |
| 3 | 11 | 16 | — | 14 |
| 6 | 27 | 25 | — | 24 |
| 10 | 63 | 48 | — | 45 |
| 12 | 113 | 90 | — | 65 |
| Permanent Displacement | 86 | 51 | — | 40 |

[4]Sample failed at 1 ton.

As indicated above in Table 9, the polyurethane composition placed in the steel tube pretreated with water failed prematurely, whereas the stabilizing composition containing the "non-shrink" polyester resin did not fail prematurely. This indicates that the "non-shrink" polyester resin containing stabilizing composition exhibits superior stability to water. From the foregoing description, one of ordinary skill in the art can easily ascertain the essential characteristics of the instant inventions, and, without departing from the spirit and scope of thereof, can make various changes and/or modifications of the inventions to adapt it to various usages and conditions. As such, these changes and/or modifications are properly, equitably and intended to be, within the full range of equivalents of the following claims.

What is claimed is:

1. A method for stabilizing a subterranean formation comprising introducing a pumpable stabilizing composition into a subterranean formation by pumping said composition through a hose and from the hose into said subterranean formation, and allowing said composition to cure thereby stabilizing said formation, wherein said composition comprises a non-shrink polyester resin system including a mixture of expanding and shrinking resins and a catalyst therefor.

2. A method for stabilizing a subterranean formation comprising introducing a pumpable stabilizing composition into a subterranean formation by pumping said composition into said subterranean formation, and allowing said composition to cure thereby stabilizing said formation, wherein said composition comprises a non-shrink synthetic resin system containing thermoplastic microspheres.

3. A method for stabilizing a subterranean formation comprising introducing a pumpable stabilizing composition into a subterranean formation by pumping said composition through a hose and a nozzle attached to the hose and from the nozzle into said subterranean formation, and allowing said composition to cure thereby stabilizing said formation, wherein said composition comprises a polyisocyanate free non-shrink synthetic resin system including a mixture of expanding and shrinking resins.

4. A pumpable composition useful for stabilizing a subterranean formation by pumping said composition through a nozzle into said formation comprising a stabilizing effective amount of a non-shrink polyester resin, and based on the weight of the resin, at least 20 wt % inert filler, about 0.5 to about 5 wt % catalyst, about 0.5 to about 5 wt % catalyst promoter, less than 5 wt % liquid extenders, less than 1 wt % anti-setting agent, less than 2 wt % adhesion promoter, less than 2 wt % wetting agent, less than 2 wt % inhibitor, less than 3 wt % water and an amount of thermoplastic microspheres sufficient to prevent shrinkage upon curing.

5. The method for stabilizing a subterranean formation as defined in claim 1, wherein said composition is pumped at least 100 feet into said formation.

6. The method for stabilizing a subterranean formation as defined in claim 1, wherein said stabilizing composition contains one or more inert fillers.

7. The method for stabilizing a subterranean formation as defined in claim 6, wherein said filler is calcium carbonate.

8. The method for stabilizing a subterranean formation as defined in claim 6, wherein said filler is employed in an amount from about 15 wt % to about 120 wt % based on the amount of said resin.

9. The method for stabilizing a subterranean formation as defined in claim 1, wherein said polyester resin composition has a viscosity below 30,000 cps.

10. The method for stabilizing a subterranean formation as defined in claim 9, wherein said polyester resin composition has a viscosity below 5,000 cps.

11. The method for stabilizing a subterranean formation as defined in claim 2, wherein said polyester resin composition is polyisocyanate free.

12. The method for stabilizing a subterranean formation as defined in claim 1, wherein said stabilizing composition gels within about 10 seconds to about 10 minutes of introducing into said subterranean formation.

13. The method for stabilizing a subterranean formation as defined in claim 1, wherein said stabilizing composition cures within 1 hour of introducing into said subterranean formation.

14. The method for stabilizing a subterranean formation as defined in claim 1, wherein said stabilizing composition further comprises an inhibitor, an adhesion promoter and/or a wetting agent.

15. The method for stabilizing a subterranean formation as defined in claim 14, wherein said stabilizing composition comprises an inhibitor in an amount from about 0.01 wt % to about 2 wt % based on the weight of the resin.

16. The method for stabilizing a subterranean formation as defined in claim 15, wherein said stabilizing composition comprises an adhesion promotor in an amount from about 0.01 wt % to about 2 wt % based on the weight of the resin.

17. The method for stabilizing a subterranean formation as defined in claim 15, wherein said stabilizing composition comprises a wetting agent in an amount from about 0.01 wt % to about 2 wt % based on the weight of the resin.

18. The method for stabilizing a subterranean formation as defined in claim 2, wherein said stabilizing composition comprises a non-shrink polyester resin containing thermoplastic microspheres.

19. The method for stabilizing a subterranean formation as defined in claim 1, wherein said stabilizing composition comprises a stabilizing effective amount of a non-shrink polyester resin, and based on the weight of the resin, at least 20 wt % inert filler, about 0.5 to about 5 wt % catalyst, about 0.5 to about 5 wt % catalyst promoter, less than 5 wt % liquid extenders, less than 1 wt % anti-setting agent, less than 2 wt % adhesion promoter, less than 2 wt % wetting agent, less than 2 wt % inhibitor and less than 3 wt % water.

20. The method according to claim 1, wherein said stabilizing composition is pumped through a nozzle into cracks and crevices within the subterranean formation.

21. The method according to claim 1, wherein said stabilizing composition employed is a multi-component system and mixed prior to introduction into the subterranean formation.

22. The method for stabilizing a subterranean formation as defined in claim 5, wherein said composition is pumped between 100 feet and 2000 feet into said formation.

23. The method for stabilizing a subterranean formation as defined in claim 5, wherein said composition is pumped between 500 feet and 1000 feet into said formation.

* * * * *